United States Patent
Zhao et al.

(10) Patent No.: US 10,979,814 B2
(45) Date of Patent: Apr. 13, 2021

(54) ADAPTIVE AUDIO CONTROL DEVICE AND METHOD BASED ON SCENARIO IDENTIFICATION

(71) Applicant: Beijing Xiaoniao Tingting Technology Co., LTD, Beijing (CN)

(72) Inventors: Jian Zhao, Beijing (CN); Jiandan Liu, Beijing (CN)

(73) Assignee: Beijing Xiaoniao Tingling Technology Co., LTD, Beijing (CN)

( * ) Notice: Subject to any disclaimer, the term of this patent is extended or adjusted under 35 U.S.C. 154(b) by 0 days.

(21) Appl. No.: 16/647,768

(22) PCT Filed: Jan. 7, 2019

(86) PCT No.: PCT/CN2019/070657
§ 371 (c)(1),
(2) Date: Mar. 16, 2020

(87) PCT Pub. No.: WO2019/141102
PCT Pub. Date: Jul. 25, 2019

(65) Prior Publication Data
US 2020/0236466 A1    Jul. 23, 2020

(30) Foreign Application Priority Data

Jan. 17, 2018 (CN) .......................... 20181004127.X

(51) Int. Cl.
*H04R 5/04* (2006.01)
*H04R 5/033* (2006.01)
(Continued)

(52) U.S. Cl.
CPC .............. *H04R 5/04* (2013.01); *G06F 3/011* (2013.01); *G06F 3/017* (2013.01);
(Continued)

(58) Field of Classification Search
CPC ... H04R 5/04; H04R 3/04; H04R 3/12; H04R 5/033; H04R 2430/01; H04R 2225/41;
(Continued)

(56) References Cited

U.S. PATENT DOCUMENTS 9,769,556 B2   9/2017   Honeycutt
9,866,707 B2   1/2018   Liu
(Continued)

FOREIGN PATENT DOCUMENTS

CN   101458931 A   6/2009
CN   101911724 A   12/2010
(Continued)

OTHER PUBLICATIONS

International Search Report dated Apr. 10, 2019 in corresponding PCT Application No. PCT/CN2019/070657.
(Continued)

*Primary Examiner* — Mark Fischer
(74) *Attorney, Agent, or Firm* — Mintz Levin Cohn Ferris Glovsky and Popeo, P.C.; Steven M. Jensen

(57) ABSTRACT

An adaptive audio control method based on scenario identification includes: acquiring acceleration data of a user, and analyzing a use scenario of the user according to the acceleration data; acquiring an ambient sound signal of the surrounding environment of the user, calculating a sound level intensity of the ambient sound signal, and analyzing an energy and a spectral distribution of the ambient sound signal; and controlling, according to the use scenario, the sound level intensity of the ambient sound signal, and the energy and the spectral distribution of the ambient sound signal, an audio signal volume, and an active noise cancellation level, and regulation of the ambient sound signal of an audio playback device. The method further enables acquisition of geographic location data of the user and uses the
(Continued)

same, as well as acceleration data, for analysis of the use scenario of the user.

20 Claims, 2 Drawing Sheets

(51) Int. Cl.
    *H04R 3/04*     (2006.01)
    *H04R 3/12*     (2006.01)
    *G10L 21/0208*     (2013.01)
    *G06F 3/01*     (2006.01)
    *H04W 4/029*     (2018.01)

(52) U.S. Cl.
    CPC ............ *G10L 21/0208* (2013.01); *H04R 3/04* (2013.01); *H04R 3/12* (2013.01); *H04R 5/033* (2013.01); *H04W 4/029* (2018.02); *H04R 2430/01* (2013.01)

(58) Field of Classification Search
    CPC ............ H04R 2410/07; H04R 2460/01; H04R 1/1083; H04R 1/1041; H04W 4/029; H04W 4/02; H04W 4/027; G06F 3/011; G06F 3/017; G10L 21/0208
    See application file for complete search history.

(56) References Cited

U.S. PATENT DOCUMENTS 10,200,545 B2     2/2019     Liu
10,524,082 B1 *     12/2019     Carroll .................... G01P 15/08
2012/0259626 A1     10/2012     Li et al.
2014/0198929 A1     7/2014     Honeycutt
2017/0034362 A1     2/2017     Liu
2017/0353782 A1     12/2017     Honeycutt
2018/0084116 A1     3/2018     Liu

FOREIGN PATENT DOCUMENTS

| | | |
|---|---|---|
| CN | 102124758 A | 7/2011 |
| CN | 103026733 A | 4/2013 |
| CN | 103364812 A | 10/2013 |
| CN | 103945062 A | 7/2014 |
| CN | 104081789 A | 10/2014 |
| CN | 104158506 A | 11/2014 |
| CN | 204857179 U | 12/2015 |
| CN | 105530581 A | 4/2016 |
| CN | 105554610 A | 5/2016 |
| CN | 105611443 A | 5/2016 |
| CN | 106285083 A | 1/2017 |
| CN | 106678552 A | 5/2017 |
| CN | 106792315 A | 5/2017 |
| CN | 107105359 A | 8/2017 |
| CN | 107484058 A | 12/2017 |

OTHER PUBLICATIONS

Written Opinion of the International Searching Authority dated Apr. 10, 2019 in corresponding PCT Application No. PCT/CN2019/070657.

* cited by examiner

ADAPTIVE AUDIO CONTROL DEVICE AND METHOD BASED ON SCENARIO IDENTIFICATION

TECHNICAL FIELD

The application relates to an electroacoustic transformation technology, and in particular to an adaptive audio control device and method based on scenario identification.

BACKGROUND

In the conventional art, a user sometimes uses an audio playback device in a noise environment. In order to solve the noise problem, an audio playback device with a function of passive noise cancellation/active noise cancellation appears, for example, a noise-canceling headphone, so as to eliminate the effect of noises on the user. The inventor finds that eliminating only the noise cannot satisfy the user's requirements for playback effects; the user hopes that the audio playback device is more intelligent, and can automatically regulate the playback effects to adapt to the current playback environment.

In the acoustic field, in order to reflect the subjective auditory feeling of human ears to external noise loudness well, the equivalent continuous A sound level is usually used to evaluate environmental noises. When the environmental noise is less than 50 dBA, people think that the environment is relatively quiet; when the noise is greater than 80 dBA, people feel the environment is noisy; when the noise reaches 120 dBA, people will find it is unbearable. When people are in a noise environment where the noise is greater than 90 dBA, the possibility of hearing impairment is significantly higher.

So, it is necessary to provide an adaptive audio playback control solution.

SUMMARY

The disclosure aims to provide an adaptive audio control method based on scenario identification, so as to automatically regulate the playback effects according to a usage scenario of a user.

According to the first aspect of the disclosure, an adaptive audio control device based on scenario identification is provided, which includes: an ambient sound acquisition microphone, an acceleration sensor, a location module, a control module, an audio signal volume adjustment module, an active noise cancellation module, and an ambient sound adjustment module. Output ends of the audio signal volume adjustment module, the active noise cancellation module, and the ambient sound adjustment module are connected with a speaker respectively.

The control module includes a memory and a processor. The memory stores a computer program. When executed by the processor, the computer program implements the following steps:

a usage scenario of a user is analyzed according to acceleration data output by the acceleration sensor and geographic location data output by the location module;

a sound pressure level (SPL) of an ambient sound signal acquired by the ambient sound acquisition microphone is calculated, and an energy distribution and an spectral distribution of the ambient sound signal is analyzed;

the working of the audio signal volume adjustment module, the active noise cancellation module, and the ambient sound adjustment module is controlled according to the usage scenario, the sound pressure level of the ambient sound signal, and the energy distribution and the spectral distribution of the ambient sound signal.

In an implementation mode, the ambient sound adjustment module includes any one of a combination of the following submodules: a wind noise suppression submodule, a voice enhancement submodule, a dynamic range control submodule, and an EQ processing submodule.

In an implementation mode, the operation that the usage scenario of the user is analyzed according to the acceleration data output by the acceleration sensor and the geographic location data output by the location module includes that:

an environment type of the user are determined according to the geographic location data;

a movement speed of the user is calculated according to the geographic location data;

a cadence value of the user is calculated according to the acceleration data; and a motion mode of the user are determined according to the movement speed and the cadence value.

In an implementation mode, the environment types include an indoor environment and a road environment; the motion modes include any one of: a stationary mode, a walking mode, or a transportation mode.

In an implementation mode, if the movement speed is less than a first speed threshold and the cadence value is less than a first cadence value threshold, the user is in the stationary mode;

if the movement speed is in a walking speed interval and the cadence value is in a walking cadence value interval, the user is in the walking mode;

if the movement speed is greater than a second speed threshold, the user is in the transportation mode.

In an implementation mode, the device further includes a bone conduction microphone or an infrared proximity sensor. The usage scenario of the user also includes a talking state of the user.

When executed by the processor, the computer program implements the following steps:

it is determined, according to a signal output by the bone conduction microphone or the infrared proximity sensor, whether the user is in the talking mode.

In an implementation mode, there are a plurality of ambient sound acquisition microphones, including the microphones for acquiring the ambient sound of a real-time location of the user and the microphones for acquiring the ambient sound heard at an ear of the user.

In an implementation mode, if the usage scenario is that the user is in the road environment and in the walking mode, the operation that the working of the audio signal volume adjustment module, the active noise cancellation module, and the ambient sound adjustment module is controlled according to the usage scenario, the sound pressure level of the ambient sound signal, and the energy distribution and the spectral distribution of the ambient sound signal includes that:

the wind noise suppression submodule is controlled to perform suppressive filtering to a wind noise signal in the ambient sound signal;

it is monitored whether the ambient sound signal contains a voice signal; if the ambient sound signal contains a voice signal, the voice enhancement submodule is triggered to perform enhancement processing on the voice signal in the ambient sound signal;

the dynamic range control submodule is controlled to perform dynamic range adjustment on the ambient sound signal according to the sound pressure level of the ambient sound signal;

the EQ processing submodule is controlled to perform EQ compensation processing on the ambient sound signal; working parameters of the audio signal volume adjustment module are controlled according to the sound pressure level of the ambient sound signal reaching a speaker, so that the sound pressure level of the audio signal reaching the speaker and the sound pressure level of the ambient sound signal reaching the speaker keep a preset proportion.

In an implementation mode, if the usage scenario is that the user is in the road environment and in the walking mode, that the dynamic range control submodule is controlled to perform the dynamic range adjustment on the ambient sound signal according to the sound pressure level of the ambient sound signal includes that:

when the sound pressure level of the ambient sound signal is greater than 40 dBA and less than or equal to 50 dBA, amplification processing is performed to the ambient sound signal; and when the sound pressure level of the ambient sound signal is greater than 60 dBA, attenuation processing is performed to the ambient sound signal.

In an implementation mode, performing the EQ compensation processing on the ambient sound signal includes performing the EQ compensation processing on a voice signal band and a honk signal band in the ambient sound signal.

In an implementation mode, if the usage scenario is that the user is in the road environment and in the walking mode, the operation that the working of the audio signal volume adjustment module, the active noise cancellation module, and the ambient sound adjustment module is controlled according to the usage scenario, the sound pressure level of the ambient sound signal, and the energy distribution and the spectral distribution of the ambient sound signal further includes that:

it is determined, according to the sound pressure level of the ambient sound signal, whether to enable the active noise cancellation module, and if the active noise cancellation module is enabled, a noise cancellation level of the active noise cancellation module is adjusted according to the sound pressure level of the ambient sound signal.

In an implementation mode, if the usage scenario is that the user is in the road environment and in the transportation mode, the operation that the working of the audio signal volume adjustment module, the active noise cancellation module, and the ambient sound adjustment module is controlled according to the usage scenario, the sound pressure level of the ambient sound signal, and the energy distribution and the spectral distribution of the ambient sound signal further includes that:

it is monitored whether the ambient sound signal contains the voice signal; if the ambient sound signal contains a voice signal, the voice enhancement submodule is triggered to perform enhancement processing on the voice signal in the ambient sound signal, and the EQ processing submodule is triggered to perform EQ compensation processing on the voice signal in the ambient sound signal;

the active noise cancellation module is controlled to perform active noise cancellation processing according to a highest noise cancellation level; or, it is determined, according to the sound pressure level of the ambient sound signal, whether to enable the active noise cancellation module, and if the active noise cancellation module is enabled, the noise cancellation level of the active noise cancellation module is adjusted according to the sound pressure level of the ambient sound signal; and the working parameters of the audio signal volume adjustment module are controlled according to the sound pressure level of the ambient sound signal reaching the speaker, so that the sound pressure level of the audio signal reaching the speaker and the sound pressure level of the ambient sound signal reaching the speaker keep the preset proportion.

In an implementation mode, if the usage scenario is that the user is in the road environment and in the transportation mode, the operation that the working of the audio signal volume adjustment module, the active noise cancellation module, and the ambient sound adjustment module is controlled according to the usage scenario, the sound pressure level of the ambient sound signal, and the energy distribution and the spectral distribution of the ambient sound signal further includes that:

the wind noise suppression submodule is controlled to be disabled; and/or it is monitored whether the sound pressure level of the ambient sound signal is greater than a preset upper limit of the sound pressure level or less than a preset lower limit of the sound pressure level; if the sound pressure level of the ambient sound signal is greater than the preset upper limit of the sound pressure level, the dynamic range control submodule is triggered to perform attenuation processing on the ambient sound signal; and if the sound pressure level of the ambient sound signal is less than the preset lower limit of the sound pressure level, the dynamic range control submodule is triggered to perform amplification processing on the ambient sound signal.

In an implementation mode, if the usage scenario is that the user is in the indoor environment and in the stationary mode and the talking mode, the operation that the working of the audio signal volume adjustment module, the active noise cancellation module, and the ambient sound adjustment module is controlled according to the usage scenario, the sound pressure level of the ambient sound signal, and the energy distribution and the spectral distribution of the ambient sound signal further includes that:

the voice enhancement submodule is controlled to perform the enhancement processing on the voice signal in the ambient sound signal;

the EQ processing submodule is controlled to perform the EQ compensation processing on the voice signal band in the ambient sound signal;

the active noise cancellation module is controlled to be disabled or perform the active noise cancellation processing on the ambient sound signal; and the audio signal volume adjustment module is controlled to turn down the volume or stop playing the audio signal.

In an implementation mode, if the usage scenario is that the user is in the indoor environment and in the stationary mode and the talking mode, the operation that the working of the audio signal volume adjustment module, the active noise cancellation module, and the ambient sound adjustment module is controlled according to the usage scenario, the sound pressure level of the ambient sound signal, and the energy distribution and the spectral distribution of the ambient sound signal further includes that:

the wind noise suppression submodule and the dynamic range control submodule are controlled to be disabled.

In an implementation mode, the device is a headphone.

According to the second aspect of the disclosure, an adaptive audio control method based on scenario identification is provided, which includes the following steps:

the acceleration data and the geographic location data of the user is acquired, and the usage scenario of the user is analyzed according to the acceleration data and the geographic location data;

the ambient sound signal of surrounding environment of the user is acquired, the sound pressure level of the ambient sound signal is calculated, and the energy distribution and the spectral distribution of the ambient sound signal is analyzed; and the working of the audio signal volume adjustment module, the active noise cancellation module, and the ambient sound adjustment module of the audio playback device is controlled according to the usage scenario, the sound pressure level of the ambient sound signal, and the energy distribution and the spectral distribution of the ambient sound signal.

In an implementation mode, the ambient sound adjustment module includes any one of a combination of the following submodules: the wind noise suppression submodule, the voice enhancement submodule, the dynamic range control submodule, and the EQ processing submodule.

In an implementation mode, the operation that the usage scenario of the user is analyzed according to the acceleration data and the geographic location data includes that:

the environment type of the user are determined according to the geographic location data;

the movement speed of the user is calculated according to the geographic location data;

the cadence value of the user is calculated according to the acceleration data; and the motion mode of the user are determined according to the movement speed and the cadence value.

In an implementation mode, the environment types include the indoor environment and the road environment; the motion modes include any one of the followings: the stationary mode, the walking mode, and the transportation mode.

In an implementation mode, if the movement speed is less than the first speed threshold and the cadence value is less than the first cadence value threshold, the user is in the stationary mode;

if the movement speed is in the walking speed interval and the cadence value is in the walking cadence value interval, the user is in the walking mode;

if the movement speed is greater than the second speed threshold, the user is in the transportation mode.

In an implementation mode, the audio playback device further includes the bone conduction microphone or the infrared proximity sensor. The usage scenario of the user also includes the talking state of the user. The method further includes the following step:

it is determined, according to the signal output by the bone conduction microphone or the infrared proximity sensor, whether the user is in the talking mode.

In an implementation mode, that the ambient sound signal of surrounding environment of the user is acquired includes that: the ambient sound signal of the real-time location of the user is acquired, and the ambient sound signal heard at an ear of the user is acquired.

In an implementation mode, if the usage scenario is that the user is in the road environment and in the walking mode, the operation that the working of the audio signal volume adjustment module, the active noise cancellation module, and the ambient sound adjustment module is controlled according to the usage scenario, the sound pressure level of the ambient sound signal, and the energy distribution and the spectral distribution of the ambient sound signal further includes that:

the wind noise suppression submodule is controlled to perform the suppressive filtering to the wind noise signal in the ambient sound signal;

it is monitored whether the ambient sound signal contains a voice signal; if the ambient sound signal contains a voice signal, the voice enhancement submodule is triggered to perform the enhancement processing on the voice signal in the ambient sound signal;

the dynamic range control submodule is controlled to perform the dynamic range adjustment on the ambient sound signal according to the sound pressure level of the ambient sound signal;

the EQ processing submodule is controlled to perform EQ compensation processing on the ambient sound signal; the working parameters of the audio signal volume adjustment module are controlled according to the sound pressure level of the ambient sound signal reaching the speaker of the audio playback device, so that the sound pressure level of the audio signal reaching the speaker and the sound pressure level of the ambient sound signal reaching the speaker keep the preset proportion.

In an implementation mode, if the usage scenario is that the user is in the road environment and in the walking mode, that the dynamic range control submodule is controlled to perform the dynamic range adjustment on the ambient sound signal according to the sound pressure level of the ambient sound signal includes that:

when the sound pressure level of the ambient sound signal is greater than 40 dBA and less than or equal to 50 dBA, the amplification processing is performed to the ambient sound signal;

when the sound pressure level of the ambient sound signal is greater than 60 dBA, the attenuation processing is performed to the ambient sound signal.

In an implementation mode, performing the EQ compensation processing on the ambient sound signal includes performing the EQ compensation processing on the voice signal band and the honk signal band in the ambient sound signal.

In an implementation mode, if the usage scenario is that the user is in the road environment and in the walking mode, the operation that the working of the audio signal volume adjustment module, the active noise cancellation module, and the ambient sound adjustment module is controlled according to the usage scenario, the sound pressure level of the ambient sound signal, and the energy distribution and the spectral distribution of the ambient sound signal further includes that:

it is determined, according to the sound pressure level of the ambient sound signal, whether to enable the active noise cancellation module, and if the active noise cancellation module is enabled, the noise cancellation level of the active noise cancellation module is adjusted according to the sound pressure level of the ambient sound signal.

In an implementation mode, if the usage scenario is that the user is in the road environment and in the transportation mode, the operation that the working of the audio signal volume adjustment module, the active noise cancellation module, and the ambient sound adjustment module is controlled according to the usage scenario, the sound pressure level of the ambient sound signal, and the energy distribution and the spectral distribution of the ambient sound signal further includes that:

it is monitored whether the ambient sound signal contains the voice signal; if the ambient sound signal contains a voice signal, the voice enhancement submodule is triggered to perform enhancement processing on the voice signal in the ambient sound signal, and the EQ processing submodule is triggered to perform EQ compensation processing on the voice signal in the ambient sound signal;

the active noise cancellation module is controlled to perform active noise cancellation processing according to a highest noise cancellation level; or, it is determined, according to the sound pressure level of the ambient sound signal, whether to enable the active noise cancellation module, and if the active noise cancellation module is enabled, the noise cancellation level of the active noise cancellation module is adjusted according to the sound pressure level of the ambient sound signal;

the working parameters of the audio signal volume adjustment module are controlled according to the sound pressure level of the ambient sound signal reaching the speaker of the audio playback device, so that the sound pressure level of the audio signal reaching the speaker and the sound pressure level of the ambient sound signal reaching the speaker keep the preset proportion.

In an implementation mode, if the usage scenario is that the user is in the road environment and in the transportation mode, the operation that the working of the audio signal volume adjustment module, the active noise cancellation module, and the ambient sound adjustment module is controlled according to the usage scenario, the sound pressure level of the ambient sound signal, and the energy distribution and the spectral distribution of the ambient sound signal further includes that:

the wind noise suppression submodule is controlled to be disabled; and/or it is monitored whether the sound pressure level of the ambient sound signal is greater than the preset upper limit of the sound pressure level or less than the preset lower limit of the sound pressure level; if the sound pressure level of the ambient sound signal is greater than the preset upper limit of the sound pressure level, the dynamic range control submodule is triggered to perform the attenuation processing on the ambient sound signal; and if the sound pressure level of the ambient sound signal is less than the preset lower limit of the sound pressure level, the dynamic range control submodule is triggered to perform the amplification processing on the ambient sound signal.

In an implementation mode, if the usage scenario is that the user is in the indoor environment and in the stationary mode and the talking mode, the operation that the working of the audio signal volume adjustment module, the active noise cancellation module, and the ambient sound adjustment module is controlled according to the usage scenario, the sound pressure level of the ambient sound signal, and the energy distribution and the spectral distribution of the ambient sound signal further includes that:

the voice enhancement submodule is controlled to perform the enhancement processing on the voice signal in the ambient sound signal;

the EQ processing submodule is controlled to perform the EQ compensation processing on the voice signal band in the ambient sound signal;

the active noise cancellation module is controlled to be disabled or perform the active noise cancellation processing on the ambient sound signal;

the audio signal volume adjustment module is controlled to turn down the volume or stop playing the audio signal.

In an implementation mode, if the usage scenario is that the user is in the indoor environment and in the stationary mode and the talking mode, the operation that the working of the audio signal volume adjustment module, the active noise cancellation module, and the ambient sound adjustment module is controlled according to the usage scenario, the sound pressure level of the ambient sound signal, and the energy distribution and the spectral distribution of the ambient sound signal further includes that:

the wind noise suppression submodule and the dynamic range control submodule are controlled to be disabled.

In an implementation mode, the audio playback device is a headphone.

According to the third aspect of the disclosure, a method for controlling an audio playback device is presented, which includes the following steps: the acceleration data of the user is acquired, and the usage scenario of the user is analyzed according to the acceleration data; the ambient sound signal of surrounding environment of the user is acquired, the sound pressure level of the ambient sound signal is calculated, and the energy distribution and the spectral distribution of the ambient sound signal is analyzed; and the audio signal volume, the active noise cancellation level, and the adjustment of the ambient sound signal of the audio playback device are controlled according to the usage scenario, the sound pressure level of the ambient sound signal, and the energy distribution and the spectral distribution of the ambient sound signal.

In an implementation mode, the method further includes the following steps: the geographic location data of the user is acquired; and the usage scenario of the user is analyzed according to the acceleration data and the geographic location data.

According to the fourth aspect of the disclosure, a system for controlling an audio playback device is presented, which includes: one or more processors; and a memory which is coupled to at least one of the one or more processors. There are computer program instructions stored in the memory. When the computer program instructions are executed by the at least one processor, the system performs the method for controlling an audio playback device. The method includes the following operation: the acceleration data of the user is acquired, and the usage scenario of the user is analyzed according to the acceleration data; the ambient sound signal of surrounding environment of the user is acquired, the sound pressure level of the ambient sound signal is calculated, and the energy distribution and the spectral distribution of the ambient sound signal is analyzed; and the audio signal volume, the active noise cancellation level, and the adjustment of the ambient sound signal of the audio playback device are controlled according to the usage scenario, the sound pressure level of the ambient sound signal, and the energy distribution and the spectral distribution of the ambient sound signal.

According to the fifth aspect of the disclosure, a computer program product is presented. When executed by the processor, the computer program product may realize the method for controlling an audio playback device described in the third aspect of the disclosure.

The adaptive audio control device and method based on scenario identification provided by the disclosure may analyze the usage scenario of the use, and automatically regulate the playback effects according to the usage scenario.

To make the abovementioned purposes, features and advantages of the disclosure clearer and easier to understand, preferred embodiments will be described below in combination with the drawings in detail. The detailed description is as follows.

BRIEF DESCRIPTION OF DRAWINGS

In order to describe the technical solutions in the embodiments of the disclosure more clearly, the drawings required to be used in descriptions about the embodiments will be simply introduced below. It is to be noted that the drawings in the following descriptions are only some embodiments of the disclosure, and shall not be understood as limits to a scope of the disclosure. Those of ordinary skill in the art may further obtain other drawings according to these drawings without creative work.

DETAILED DESCRIPTION

Figure 1:
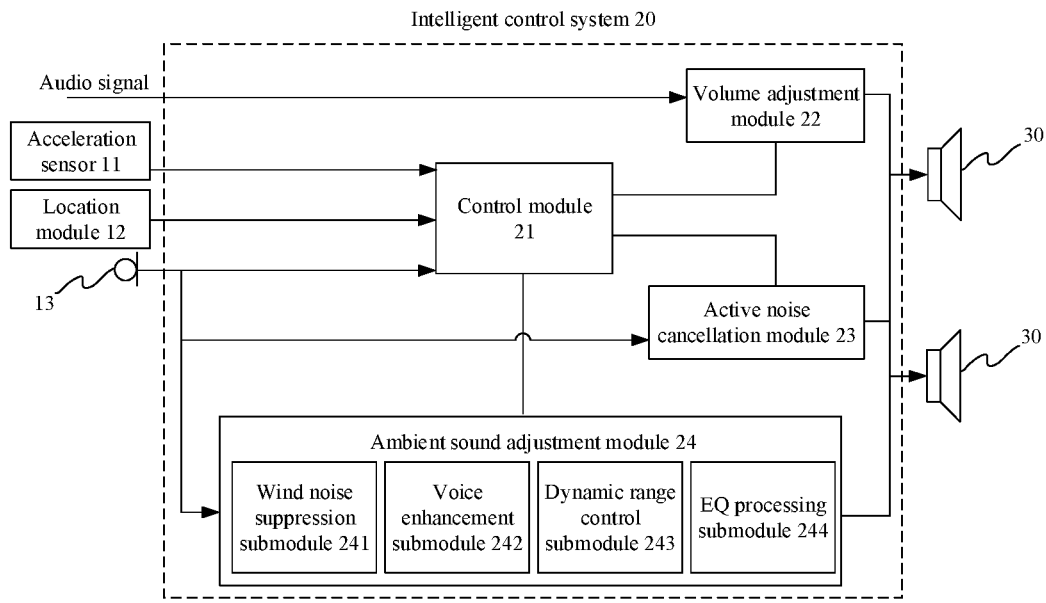
FIG. 1 illustrates a block diagram of an adaptive audio control device based on scenario identification provided by an embodiment of the disclosure.

Different exemplary embodiments of the disclosure will be described below in combination with the drawings in detail. It is to be noted that unless otherwise specified, relative placements, numerical expressions and numerical values of the parts and the steps described in the embodiments do not form any limit to the scope of the disclosure.

The following description of the at least one exemplary embodiment is merely illustrative, and shall in no way form any limits to this disclosure and its disclosure or use.

Techniques, methods and apparatus known to those of ordinary skill in the conventional art may not be discussed in detail, but under appropriate circumstances, the techniques, methods and apparatus should be considered as part of the description.

In all of the examples shown and discussed herein, any specific values are to be construed as illustrative only and not as a limitation. Thus, other examples of the exemplary embodiments may have different values.

It should be noted that similar reference numerals and letters indicate similar items in the following figures. Therefore, once an item is defined in one figure, it is not required to be further discussed in the subsequent figures.

The disclosure presents an adaptive audio control device based on scenario identification. The device may be a headphone, a loudspeaker box, or other electronic devices capable of playing an audio signal. The device may carry out wired communication or wireless communication with terminal devices like a cell phone and a computer, so as to play the audio signal of the terminal devices. The device may also store the audio signal, for example music, and the device may play the audio signal stored in it. The device may also be set in the terminal device, as a part of the terminal device.

Referring to FIG. 1, the adaptive audio control device based on scenario identification provided by the first embodiment of the disclosure includes: an ambient sound acquisition microphone 13, an acceleration sensor 11, a location module 12, a control module 21, an audio signal volume adjustment module 22, an active noise cancellation module 23, and an ambient sound adjustment module 24.

The acceleration sensor 11 is configured to acquire acceleration data of a user, and output the acceleration data to the control module 21.

The location module 12 is configured to acquire geographic location data of the user, and output the geographic location data to the control module 21.

After the audio signal volume adjustment module 22 adjusts the volume of the audio signal, the audio signal is input in a speaker 30 for playback.

The ambient sound acquisition microphone 13 is configured to pick up an ambient sound signal, and feed the picked-up ambient sound signal to the control module 21, the active noise cancellation module 23 and the ambient sound adjustment module 24 respectively. Output ends of the active noise cancellation module 23 and the ambient sound adjustment module 24 are connected with the speaker 30 respectively.

The control module 21 is connected with the audio signal volume adjustment module 22, the active noise cancellation module 23 and the ambient sound adjustment module 21 respectively, so as to control their working; for example, the control module 21 enables/disables a certain module or submodule, or adjusts parameters of a certain module or submodule.

The active noise cancellation module 23 is configured to generate a corresponding noise cancellation signal aiming at the ambient sound signal, and output the noise cancellation signal to the speaker 30. The noise cancellation signal and the ambient sound signal cancel each other in the ear canal of the user, so as to reduce the impact of the ambient sound on the user listening to the audio signal. The active noise cancellation module 24 may have a feedback noise cancellation manner, a feed-forward noise cancellation manner, and a noise cancellation manner of feed-forward combined with feedback. In a specific example, the active noise cancellation module 23 is enabled only when the sound pressure level of the ambient sound reaches 60 dBA. The active noise cancellation module 23 may be set with various noise cancellation levels; for example, when the sound level intensities of the ambient sound reach 60 dBA, 70 dBA, 80 dBA and 90 dBA respectively, each of them corresponds to a noise cancellation level. The stronger the sound pressure level of the ambient sound, the higher the noise cancellation level.

The ambient sound adjustment module 24 is configured to adjust the ambient sound signal, and output the adjusted ambient sound signal to the speaker 30. The ambient sound adjustment module 24 includes the following submodules: a wind noise suppression submodule 241, a voice enhancement submodule 242, a dynamic range control submodule 243, and an EQ processing submodule 244.

The wind noise suppression submodule 241 is mainly configured to filter the wind noise in the ambient sound signal. The wind noises mainly concentrate in very low frequency bands. Once the big wind noises are detected, different filters may be set to deal with, so as to reduce the impact of the wind noise on the user listening to the audio signal. In a specific example, when the user is in an outdoor environment, it can be determined, according to an energy distribution and an spectral distribution of the wind noises, whether it is needed to enable the wind noise suppression submodule 241. When the user is in an indoor environment, the wind noise suppression submodule 241 may be disabled.

The voice enhancement submodule 242 is mainly configured to enhance the voice part in the ambient sound signal, suppress and reduce a noise interference, and improve a signal-to-noise ratio of the voice part, so that the user can hear the outside voice more clearly. In a specific example, when the user is in a talking state, the voice enhancement submodule 241 is enabled. In a specific example, when the user is in a state of being necessary to hear an outside prompt voice, the voice enhancement submodule 241 is enabled. The voice enhancement submodule 242 may perform enhancement processing to a voice signal in the ambient sound signal and perform suppression processing to an ambient noise, thereby realizing a voice enhancement function.

The dynamic range control submodule 243 is mainly configured to perform dynamic range adjustment on the ambient sound signal; for example, it is possible to first compress some impulse sounds and then feed them to the headphone, so as to avoid a very big distortion at the headphone. In a specific example, the dynamic range control submodule 243 is always in an enabled state in all circumstances, so as to prevent a burst sound from startling and damaging the user. In another specific example, when the user is in the outdoor environment, the dynamic range control submodule 243 must be enabled; when the user is in the indoor environment, because there are a relatively few burst sounds in the indoor environment, the dynamic range control submodule 243 may be disabled.

The EQ processing submodule 244 is mainly configured to enhance and attenuate the ambient sound aiming at different frequency bands, so as to optimize listening feeling of the ambient sound. In a specific example, if it is needed to hear parts of the ambient sounds, the EQ processing submodule 244 will be enabled, so as to perform compensation enhancement to the ambient sounds on a part of the frequency bands.

Figure 2:
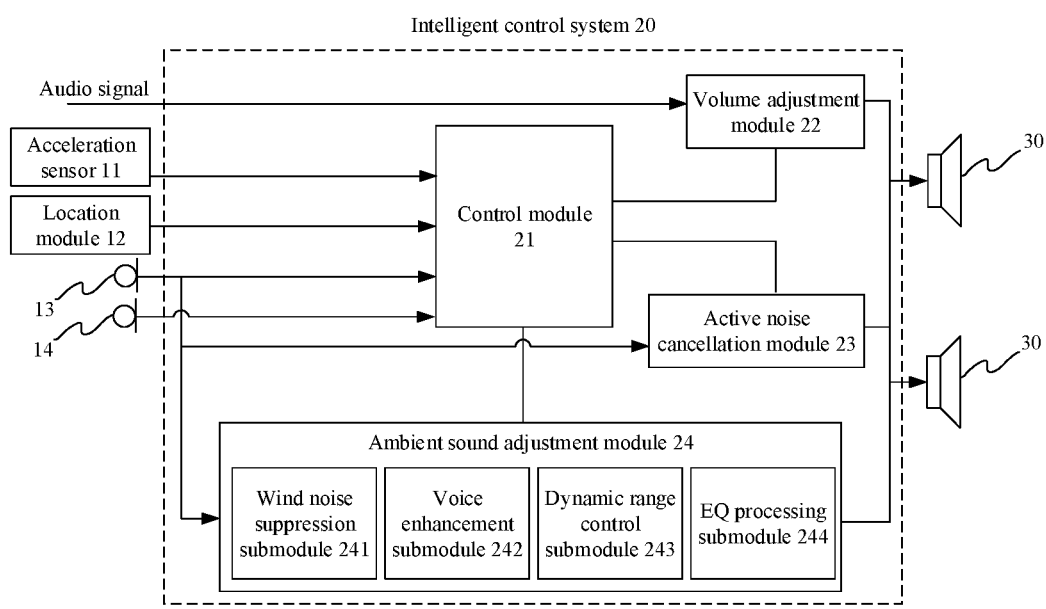
FIG. 2 illustrates a block diagram of an adaptive audio control device based on scenario identification provided by another embodiment of the disclosure.

FIG. 2 illustrates an adaptive audio control device based on scenario identification provided by another embodiment of the disclosure. The embodiment of FIG. 2 has all the structures and functions provided by the embodiment of FIG. 1. The main difference is that the device in the embodiment of FIG. 2 further includes a bone conduction microphone 14. The output end of the bone conduction microphone 14 is connected with the control module 21.

Figure 3:
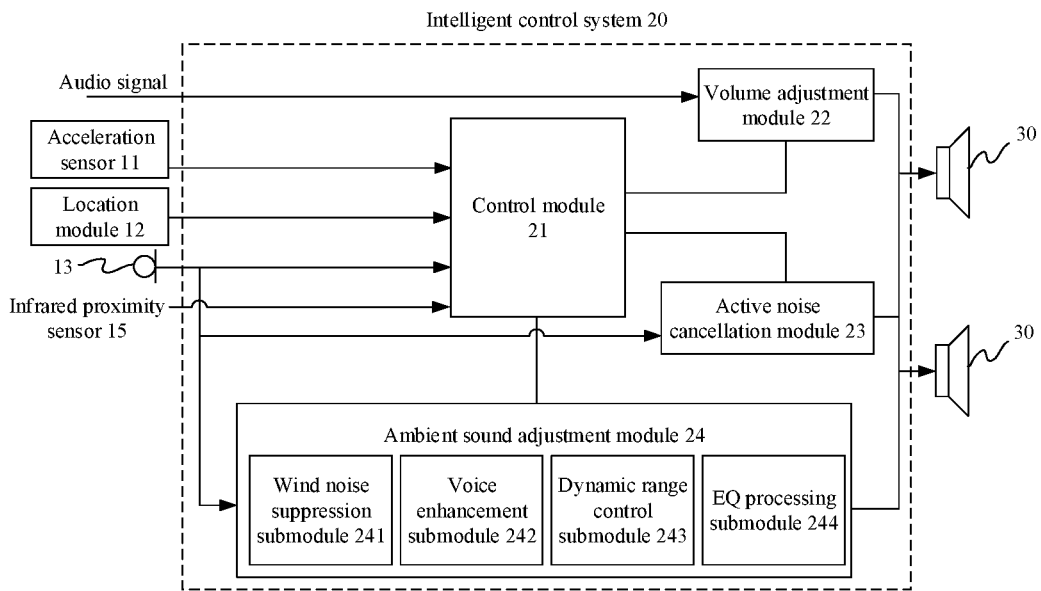
FIG. 3 illustrates a block diagram of an adaptive audio control device based on scenario identification provided by yet another embodiment of the disclosure.

FIG. 3 illustrates an adaptive audio control device based on scenario identification provided by yet another embodiment of the disclosure. The embodiment of FIG. 3 has all the structures and functions provided by the embodiment of FIG. 1. The main difference is that the device in the embodiment of FIG. 3 further includes an infrared proximity sensor 15 towards the front of the user. The output end of the infrared proximity sensor 15 is connected with the control module 21.

In the embodiments of FIG. 1, FIG. 2 and FIG. 3, the ambient sound adjustment module 24 includes the following submodules: the wind noise suppression submodule 241, the voice enhancement submodule 242, the dynamic range control submodule 243, and the EQ processing submodule 244. In other embodiment, the ambient sound adjustment module 24 may also include any one or a combination of the above submodules, or includes other submodules.

In an embodiment, the device may also be equipped with a passive noise cancellation structure made of a sound insulating material. The passive noise cancellation is physical noise cancellation, insulating the outside noises into the ear canal by means of a shell or an earmuff. This passive noise cancellation method has a relatively good effect on the noises above medium-high frequencies 1 kHz.

In an embodiment, the device may also be equipped with a manual volume adjustment device, a manual noise cancellation mode switch device, a manual ambient sound adjustment device, and other structures, so as to provide more selection modes for the user.

In the embodiments of FIG. 1, FIG. 2 and FIG. 3, there can be one or more ambient sound acquisition microphones 13. For example, the left and right headphones are respectively equipped with the ambient sound acquisition microphones. For example, only the left headphone is equipped with the ambient sound acquisition microphone. For example, only the right headphone is equipped with the ambient sound acquisition microphone. For example, a microphone is set on the headphone shell and configured to acquire the sound of surrounding environment of the user. For example, a microphone is set in the headphone and configured to acquire the ambient sound heard at an ear of the user. In an embodiment, there are a plurality of ambient sound acquisition microphones 13, including the microphones for acquiring the ambient sound of a real-time location of the user and the microphones for acquiring the ambient sound heard at an ear of the user.

In the adaptive audio control device based on scenario identification provided by the embodiment of the disclosure, the control module 21 includes a memory and a processor. The memory stores a computer program. When executed by the processor, the computer program implements the following steps.

At S101, a usage scenario of a user is analyzed.

According to some embodiments of the disclosure, the usage scenario of the user may be analyzed according to acceleration data output by an acceleration sensor.

According to another embodiments of the disclosure, at this step, geographic location data acquired by the location module 12 may also be acquired, and the usage scenario of the user is analyzed by means of the acceleration data and the geographic location data of the user.

At S102, a sound pressure level of an ambient sound signal acquired by the ambient sound acquisition microphone 13 is calculated, and an energy distribution and an spectral distribution of the ambient sound signal is analyzed. Components of the ambient sound may be obtained by analyzing the energy distribution and the spectral distribution of the ambient sound signal, for example, whether the ambient sound contains a voice component, a warning sound component like an alarm honk, a wind noise component, and so on, and the energy of these components.

At S103, the working of the audio signal volume adjustment module 22, the active noise cancellation module 23, and the ambient sound adjustment module 24 is controlled according to the usage scenario, the sound pressure level of the ambient sound signal, and the energy distribution and the spectral distribution of the ambient sound signal.

The control module 21 may automatically adjust a noise cancellation parameter of the active noise cancellation module 24 according to the usage scenario. Or, the active noise cancellation module 23 is set with a plurality of noise cancellation modes in advance, and each noise cancellation mode corresponds to different noise cancellation parameters. The control module 21 automatically adjusts the noise cancellation mode of the active noise cancellation module 23 according to the usage scenario, so as to achieve different noise cancellation levels or effects.

The control module 21 controls the working of the audio signal volume adjustment module 22, the active noise cancellation module 23, and the ambient sound adjustment module 24 according to the usage scenario, the sound pressure level of the ambient sound signal, and the energy distribution and the spectral distribution of the ambient sound signal. That is, the control module 21 considers comprehensively the sound pressure level of the ambient sound signal and the components of the ambient sound and the energy of each component, and controls the working of the audio signal volume adjustment module 22, the active noise cancellation module 23, and the ambient sound adjustment module 24, so that the audio control adapts to the usage scenario of the user, and the adaptive audio control implemented according to the usage scenario of the user, the sound pressure level of the ambient sound signal, and the energy distribution and the spectral distribution of the ambient sound signal is realized.

According to some embodiments of the disclosure, that the usage scenario of the user is analyzed at S101 includes the following operation.

At S1011, an environment type of the user are determined according to the geographic location data. The environment types include an indoor environment and a road environment.

At S1012, a movement speed of the user is calculated according to the geographic location data, and a cadence value of the user is calculated according to the acceleration data. A motion mode of the user are determined according to the movement speed and the cadence value. The motion modes may include any one of the followings: a stationary mode, a mode of walking on road, and a transportation mode. In another embodiment, the motion modes may include a fitness mode. The fitness mode contains running, cycling and other fitness methods.

According to some other embodiments of the disclosure, the usage scenario of the user may be analyzed only according to the acquired acceleration data of the user instead of by acquiring the geographic location data. For example, the motion mode of the user may be determined only according to the cadence value of the user.

According to some other embodiments of the disclosure, it is possible to calculate the movement speed of the user only by the geographic location data, but the geographic location data is not used for acquiring the environment type.

In the embodiment of FIG. 2 and the embodiment of FIG. 3, the usage scenario of the user may also include a talking state of the user. Specifically, the control module 21 determines whether the user is in the talking mode according to a signal output by the bone conduction microphone 14 or the infrared proximity sensor 15.

<About the Usage Scenario>

The usage scenario referred to in the embodiments of the disclosure at least includes the current motion mode of the user. Furthermore, the usage scenario may also include the environment type of the user and/or the talking state of the user, that is, whether the user is in the talking mode.

<Environment Type>

At S1011, the control module 21 may determine the environment type of the user according to the geographic location data. The environment types include the indoor environment and the road environment.

The location module 12 may include a GPS module or a Beidou module, for example. When the user enables an adaptive scenario adjustment and playback function of the device, the location module first acquires information of the specific real-time location of the user, and then determines the environment type of the user according to the information of the specific real-time location.

In other embodiments, the environment types may also be divided in more detail, so as to achieve a more flexible and intelligent audio control effect. For example, the outdoor environment type is divided into a road environment type and a non-road outdoor environment type. The non-road outdoor environment type is divided into an open-air trade and catering fair type, an outdoor park and green space type, and so on.

In a specific example, the environment types may be divided into the following types:

environment type $P_1$: urban arterial and sub-arterial roads, intercity and urban expressways, inland waterways and both sides thereof;

environment type $P_2$: main lines of railway;

environment type $P_3$: industrial production and warehouse logistics area;

environment type $P_4$: industrial and commercial markets and mixed areas of catering trade;

environment type $P_5$: administrative offices of residence, education, medical treatment and research;

environment type $P_6$: outdoor park and green space;

environment type $P_7$: rehabilitation and recuperation areas.

The environment types in the embodiments of the disclosure may be divided into "indoor" and "outdoor". The "outdoor" environment type may further be subdivided into "outdoor sports ground", "outdoor park and green space" and "outdoor fair", for example. In the embodiments of the disclosure, the environment type of the user may be determined according to the selection of the user. In the embodiments of the disclosure, the specific motion mode of the user may also be determined according to the geographic location data in combination with the energy distribution and the spectral distribution of the ambient sound signal; for example, it can be accurately determined that the user is in the outdoor environment in combination with the geographic location data after determining that there is a very strong wind noise signal included in the ambient sound signal according to the energy distribution and the spectral distribution of the ambient sound signal.

<Motion Mode>

At S1012, the control module 21 may calculate the movement speed of the user according to the geographic location data, and calculate the cadence value of the user according to the acceleration data. The motion mode of the user are determined according to the movement speed and the cadence value.

(a) If the movement speed is less than a first speed threshold and the cadence value is less than a first cadence value threshold, the user is in the stationary mode.

In an embodiment, the first cadence value threshold may be set to 0.5 steps/s, the first speed threshold may be set to 0.2 m/s; that is, if the movement speed of the user is less than 0.2 m/s and the cadence value is less than 0.5 steps/s, the user is in the stationary mode.

(b) If the movement speed is in a walking speed interval and the cadence value is in a walking cadence value interval, the user is in the walking mode.

A normal walking speed interval of people is 1 m/s to 1.7 m/s, and a normal walking cadence value interval is 1.0 step/s to 2.5 steps/s. In an embodiment, the walking cadence value interval may be set to 1.0 step/s to 2.5 steps/s.

(c) If the movement speed is greater than a second speed threshold, the user is in the transportation mode.

The running speeds of cars, ships, trains and other transports are usually greater than 30 km/h. In an embodiment, the second speed threshold may be set to 30 km/h. For example, if the monitored movement speed of the user is about 60 km/h, it can be determined that the user is taking transports.

In other embodiments, the intervals of the movement speed and the cadence value may also be divided in more detail, so as to determine the movement state of the user in detail.

In other embodiments, the motion mode of the user may also be divided in more detail; for example, the motion modes may also be divided into a stationary mode, a taking-a-walk mode, a fast-walking mode, a running mode, a cycling mode, and so on.

In an embodiment, if the cadence value of the user is in the interval of 2.5 steps/s to 5 steps/s, it is determined that the user is in the running mode.

The motion modes in the present embodiment may be divided into "motion" and "non-motion". The "motion" mode may also be further subdivided into "running", "swimming" and "cycling" for example. In the embodiments of the disclosure, the specific motion mode of the user may be determined according to the selection of the user or the output of the related sensor.

It is easy to be understood that in some embodiments, the usage scenario of the user may be analyzed only according to the acquired acceleration data of the user instead of by acquiring the geographic location data. For example, the motion mode of the user may be determined only according to the cadence value of the user.

<Talking State>

In an embodiment, the control module 21 may determine whether the user is in the talking state according to the situation where the bone conduction microphone 14 picks up the voice signal.

In another embodiment, the control module 21 may determine, according to the signal output by the infrared proximity sensor 15, whether there are other people within a certain distance range in front of the user; if there are other people within a certain distance range in front of the user, it is determined that the user is in the talking state. Or, if there are people, the control module 21 may comprehensively determine whether the user is in the talking state based on the determination situation of the environment type and the motion mode, for example, the user is in the open-air catering fair.

According to an embodiment of the disclosure, the "usage scenario" referred to in the embodiments of the disclosure is a composite scenario. The "usage scenario" at least includes the environment type of the user and the current motion mode of the user, and further may include the talking state of the user. For example, if the environment type of the user is "outdoor", and the motion mode is "motion", the "usage scenario" of the user is "outdoor motion". For example, if the environment type of the user is "indoor", and the motion mode is "motion", the "usage scenario" of the user is "indoor motion". For example, if the environment type of the user is "indoor", the motion mode is "static", and the talking state is "in the talking mode", the "usage scenario" of the user is "indoor static talking".

According to another embodiment of the disclosure, it is easy to be understood that the usage scenario of the user may be estimated according to the acceleration data. For example, if the cadence value of the user is in the interval of 2.5 steps/s to 5 steps/s, it is determined that the user is in the running mode and in the road environment.

<Adaptive Audio Control Based on Scenario Identification>

After determining the usage scenario of the user, the control module 21 controls the working of the audio signal volume adjustment module 22, the active noise cancellation module 23, and the ambient sound adjustment module 24 according to the usage scenario, the sound pressure level of the ambient sound signal, and the energy distribution and the spectral distribution of the ambient sound signal. The sound pressure level of the ambient sound signal here may use the equivalent continuous A sound level.

In an embodiment, the usage scenario includes the current environment type of the user and the current motion mode of the user. The usage scenario where the user may be in at a certain moment, the sound pressure level of the ambient sound signal, and the energy distribution and the spectral distribution of the ambient sound signal may be described by defining a function Action(t):

$$\text{Action}(t)=(P(t),M(t),L(t),F(t)) \quad \text{function 1}$$

where t is time, $P(t)$ is the environment type of the user at present, $M(t)$ is the motion mode of the user at present, $L(t)$ is the sound pressure level of the ambient sound signal or the interval to which the sound pressure level of the ambient sound signal belongs, and $F(t)$ is the energy distribution and the spectral distribution situation of the ambient sound signal.

The function $F(t)$ is defined to described the energy distribution and the spectral distribution situation of the 20-20 kHz ambient sound of the position where the user is at a certain moment.

$F(t)$ further includes $F_0(t)$ and $Q(t)$. The $F_0(t)$ is used to represent a frequency point corresponding to the maximum noise peak value at the present, and the $Q(t)$ is used to represent a quality factor of the ambient sound at the present.

Generally speaking, the greater the value of Q, the more concentrated the energy distribution of the ambient sound, and the frequency is relatively single; correspondingly, it is a non-steady noise or a burst impulse noise in the noise environment, namely a honk, a knocking noise, an impact sound, and other burst sounds. The smaller the value of Q, the wider of the ambient sound on each frequency band, and the energy distribution of noises on the frequency band is more uniform; at this point, the corresponding noise environment is relatively stable steady-state noises; for example, in a certain restaurant environment of dinner time, there are mainly background noises made by talking or light collision of tableware, and the frequencies of the background noises $F_0$ are mainly between 200 Hz and 300 Hz.

In another embodiment, the function 1 may also be adjusted to $$\text{Action}(t)=(P(t),V(t),f(t),L(t),F(t)) \quad \text{function 2,}$$

where $V(t)$ is the current movement speed of the user or the interval to which the movement speed belongs, and $f(t)$ is the current cadence value of the user or the interval to which the cadence value belongs.

In another embodiment, the usage scenario includes the talking state of the user, so the function Action(t) is:

$$\text{Action}(t)=(P(t),M(t),L(t),F(t),S(t)) \quad \text{function 3,}$$

where $S(t)$ is used to represent whether the user is in the talking mode at present.

The control module 21 determines the usage scenario of the user and the level of the ambient sound according to the thresholds and the queried or received real-time values of various sensor modules (not limited to the ambient sound acquisition microphone 13, the acceleration sensor 11, the location module 12, the bone conduction microphone 14/the infrared proximity sensor 15, and so on), and acquires the energy distribution and the spectral distribution situation of the ambient sound, namely obtaining P(t), M(t), L(t), F(t) and S(t).

The control module 21 queries the function Action(t) in real time, automatically generates control instructions according to various variables of Action(t), and send the corresponding instructions to the audio signal volume adjustment module 22, the active noise cancellation module 23, and the ambient sound adjustment module 24 respectively, so that each module makes a response matching with the current scenario and ambient sound signal, namely implementing the automatic adjustment of the playback effects to adapt to the current playback environment.

Similarly, in another embodiment, the function 3 may also be adjusted to $$Action(t)=(P(t),V(t),f(t),L(t),F(t),S(t)) \quad \text{function 4.}$$

The intervals to which the sound pressure level of the ambient sound signal belongs may include the followings:

(1) 0 dBA-40 dBA is the first sound pressure level interval, representing a very quiet environment;

(2) 40 dBA-60 dBA is the second sound pressure level interval, representing a relatively quiet environment;

(3) 60 dBA-80 dBA is the third sound pressure level interval, representing a relatively noisy environment; and (4) 80 dBA-120 dBA is the fourth sound pressure level interval, representing an unbearable noisy environment.

The intervals to which the sound pressure level of the ambient sound signal belongs may also be subdivided according to practical applications, and not completely limited to this definition.

The intervals to which the movement speed of the user belongs may include the followings, for example:

(1) 0 m/s-0.2 m/s is the first movement speed interval, representing being static;

(2) 0.2 m/s-1.7 m/s is the second movement speed interval, representing walking; and (3) above 500 km/h is the third movement speed interval, representing flight.

The intervals to which the movement speed of the user belongs may be divided in more detail, so as to help the control module 21 to determine accurately the usage scenario of the user in combination with the cadence value and the environment type of the user.

Most often, the highest cadence of people is not higher than 5 steps/s, and the lowest cadence is not lower than 0.5 steps/s, so the intervals of the cadence value of the user may include the followings:

(1) 0 step/s-0.5 steps/s is the first cadence value interval, representing being static;

(2) 0.5 steps/s-2.5 steps/s is the second cadence value interval, representing walking;

(3) 2.5 steps/s-5 steps/s is the third cadence value interval, representing running.

The intervals to which the cadence value belongs may also be subdivided according to practical applications, and not completely limited to this definition.

It is to be noted that although the situations like "static", "walking", "running" and "flight" are considered when the above intervals are divided, the motion modes (including the used transports) of the user may be comprehensively determined according to the specific environment type of the user, the interval of the movement speed of the user and the interval of the cadence value of the user; if the energy distribution and the spectral distribution of the ambient sound signal is further considered, the motion mode of the user may be determined more accurately.

In addition, the above functions also proves that the embodiments of the disclosure may comprehensively analyze the geographic location data, the movement speed, the cadence value of the user, the sound pressure level of the ambient sound signal, and the energy distribution and the spectral distribution of the ambient sound signal, thereby realizing the automatic adjustment of the playback effects according to the usage scenario.

The working processes of the adaptive audio device, provided by the embodiments of the disclosure, in several scenarios are illustrated below through several specific examples.

<First Usage Scenario>

The first usage scenario is that the user is in the road environment and in the walking mode. It is easy to be understood that in this usage scenario, the motion mode of the user may be estimated only through the acquired acceleration data, and then the usage scenario of the user is estimated. For example, if the acceleration data shows that the current cadence value of the user is in the interval of 0.5 steps/s-2.5 steps/s, it is determined that the user is in the walking mode and in the road environment. In the first usage scenario, the ambient sounds are mainly traffic noises on road and ambient low-frequency noises like the wind noises with different intensities. $F_0$ of the ambient sound signal is usually near 100 Hz, and the value of Q is relatively smaller, that is, the distribution of the low-frequency noises is relatively wide. The sound level intensities vary depending on traffic conditions of different periods of time.

In the first usage scenario, the control module 21 controls the working of the audio signal volume adjustment module 22, the active noise cancellation module 23, and the ambient sound adjustment module 24 according to the usage scenario, the sound pressure level of the ambient sound signal, and the energy distribution and the spectral distribution of the ambient sound signal, including:

the wind noise suppression submodule 241 is controlled to perform suppressive filtering to a wind noise signal in the ambient sound signal. The wind noise suppression submodule 241 may be a second order high-pass filter whose cut-off frequency $f_0$ is 300 Hz, for example.

It is monitored whether the ambient sound signal contains a voice signal; if the ambient sound signal contains a voice signal, the voice enhancement submodule 242 is triggered to perform enhancement processing on the voice signal in the ambient sound signal. That is, in the first usage scenario, the voice enhancement submodule 242 is in a standby mode, and may be wakened by the voice signal detected by the control module 21 in real time.

The dynamic range control submodule 243 is controlled to perform dynamic range adjustment on the ambient sound signal according to the sound pressure level of the ambient sound signal. In an embodiment, when the sound pressure level of the ambient sound signal is less than or equal to 40 dBA, it is determined that the outside environment is a quiet environment, the ambient sound basically does not include useful information, and light amplification processing is performed to the ambient sound signal; when the sound pressure level of the ambient sound signal is greater than 40 dBA and less than or equal to 50 dBA, selective amplification processing is performed to the ambient sound signal; when sound pressure level of the ambient sound signal is greater than 50 dBA and less than or equal to 60 dBA, amplification and reduction processing is performed to the ambient sound signal; when the sound pressure level of the ambient sound signal is greater than 60 dBA, it is determined that the environment is a relatively noisy, and attenuation processing is performed to the ambient sound signal. Through the dynamic range control, the user can enjoy music while maintaining a certain ability of monitoring and sensing the outside external environment during moving. It is to be noted that the division (≤40 dBA, 40 dBA-50 dBA, 50 dBA-60 dBA, >60 dBA) of the interval of the sound pressure level of the ambient sound signal is just an example. The division of the interval may be adjusted according to the actual condition.

The EQ processing submodule 244 is controlled to perform the EQ compensation processing on the ambient sound signal, and output the ambient sound signal to the speaker 30 for playback. For example, the EQ compensation processing is performed to the voice signal band and the honk signal band in the ambient sound signal.

It is determined, according to the sound pressure level of the ambient sound signal, whether to enable the active noise cancellation module 23, and if the active noise cancellation module 23 is enabled, a noise cancellation level of the active noise cancellation module 23 is automatically adjusted according to the sound pressure level of the ambient sound signal. The greater the sound pressure level of the ambient sound signal, the higher the noise cancellation level of the active noise cancellation module 23, and the greater the degree of the active noise cancellation. In addition, when the wind noise intensity is relatively great, an effect of feedback noise cancellation may be enhanced, and an effect of feedforward noise cancellation on the low frequency band may be weakened appropriately. A noise cancellation signal generated by the active noise cancellation module 23 is output to the speaker 30.

In an embodiment, the control module 21 may analyze whether there is a certain warning prompt in the ambient sound signal according to the energy distribution and the spectral distribution of the ambient sound signal. For example, the ambient sound acquisition microphone (13) picks up ambient noises in t to ti. If it is found, through frequency domain analysis, that pulse signals whose frequencies are 500 Hz-1500 Hz, and the quality factor Q is much greater than 1 appear in this period of time discontinuously or continuously, and the average energy of the pulse signals is higher than 10 dB of the previous period of time, it is determined that there is a certain warning sound that the user needs to be aware of in the ambient sound signal. If there is a certain warning prompt in the ambient sound signal, the control module 21 controls the active noise cancellation module 23 to perform active noise cancellation to the part, except the warning prompt, in the ambient sound signal, and controls the dynamic range control submodule 243 to perform the amplification processing to the warning prompt in the ambient sound signal, so as to ensure the safety and alertness of the user.

The working parameters of the audio signal volume adjustment module 22 are controlled according to the sound pressure level of the ambient sound signal reaching the speaker 30, so that the sound level intensities of the audio signal reaching the speaker 30 and the ambient sound signal reaching the speaker 30 keep the preset proportion. When the sound pressure level of the ambient sound becomes high, the audio signal volume may be automatically controlled to become high, that is, when the outside environment is relatively noisy, the audio signal volume is turned up. Conversely, when the sound pressure level of the ambient sound becomes low, the audio signal volume may be automatically controlled to become low, that is, when the outside environment is relatively quiet, the audio signal volume is turned down, so as to ensure the hearing of the user.

<Second Usage Scenario>

The second usage scenario is that the user is in the road environment and in the transportation mode, the control module 21 controls the working of the audio signal volume adjustment module 22, the active noise cancellation module 23, and the ambient sound adjustment module 24 according to the usage scenario, the sound pressure level of the ambient sound signal, and the energy distribution and the spectral distribution of the ambient sound signal, including:

it is monitored whether the ambient sound signal contains the voice signal; if the ambient sound signal contains a voice signal, the voice enhancement submodule 242 is triggered to perform enhancement processing on the voice signal in the ambient sound signal, and the EQ processing submodule 244 is triggered to perform EQ compensation processing on the voice signal in the ambient sound signal. That is, in the second usage scenario, the voice enhancement submodule 242 and the EQ processing submodule 244 are in the standby mode, and may be wakened by the voice signal detected by the control module 21 in real time.

The active noise cancellation module 23 is controlled to perform the active noise cancellation processing on the ambient sound signal according to a highest noise cancellation level. Or, the active noise cancellation module 23 is controlled to determine, according to the sound pressure level of the ambient sound signal, whether to be enabled, and if the active noise cancellation module 23 is enabled, the noise cancellation level of the active noise cancellation module 23 is automatically adjusted according to the sound pressure level of the ambient sound signal.

The working parameters of the audio signal volume adjustment module 22 are controlled according to the sound pressure level of the ambient sound signal reaching the speaker 30, so that the sound level intensities of the audio signal reaching the speaker 30 and the ambient sound signal reaching the speaker 30 keep the preset proportion. When the sound pressure level of the ambient sound becomes high, the audio signal volume may be automatically controlled to become high, that is, when the outside environment is relatively noisy, the audio signal volume is turned up. Conversely, when the sound pressure level of the ambient sound becomes low, the audio signal volume may be automatically controlled to become low, that is, when the outside environment is relatively quiet, the audio signal volume is turned down, so as to ensure the hearing of the user.

In an example, when the user is in the road environment and in the transportation mode, the wind noise suppression submodule (241) is controlled to be disabled.

In an example, when the user is in the road environment and in the transportation mode, it is monitored whether the sound pressure level of the ambient sound signal is greater than the preset upper limit of the sound pressure level or less than the preset lower limit of the sound pressure level; if the sound pressure level of the ambient sound signal is greater than the preset upper limit of the sound pressure level, the dynamic range control submodule (243) is triggered to perform the attenuation processing on the ambient sound signal; and if the sound pressure level of the ambient sound signal is less than the preset lower limit of the sound pressure level, the dynamic range control submodule (243) is triggered to perform the amplification processing on the ambient sound signal. The upper limit of the sound pressure level is 60 dBA, for example. The lower limit of the sound pressure level is 40 dBA, for example.

In an example, when it is determined that the user is in the transportation mode, it is possible to further determine which transport the user is taking. For example, it is possible to determine that the user is in the modes of cycling, taking a flight, taking a train, or taking a car according to the environment type, the height data in the geographic location data, the movement speed and the cadence value. For example, if the movement speed of the user reaches 250 km/h and the user is on a trunk railway, it is possible to determine that the user is in the mode of taking a high-speed train.

The control module 21 may set a specific control way of the active noise cancellation module 23 and the ambient sound adjustment module 24, for example, set the noise cancellation level of the active noise cancellation module 23 when the user is taking the high-speed train to a relatively low level, according to the features of the ambient sounds corresponding to the subdivided transports, for example, there are many honks when taking a car, and it is relatively quiet in the high-speed train.

In an example, when it is determined that the user is in the transportation mode, it is also possible to determine which transport the user is taking according to the sound pressure level of the ambient sound signal and the energy distribution and the spectral distribution of the ambient sound signal. In such a manner, the control module 21 may set the specific control way of the active noise cancellation module 23 and the ambient sound adjustment module 24 according to the features of the ambient sounds corresponding to the subdivided transports.

In the first usage scenario and the second usage scenario, the user may talk with a partner, and there may be an external voice remind, for example, a voice remind about danger or a remind of arrival of vehicles in the second usage scenario, so in the two usage scenarios, the voice enhancement submodule 242 may be triggered to work by the voice signal in the ambient sound signal detected in real time.

<Third Usage Scenario>

The third usage scenario is that the user is in the indoor environment (for example, residence, administrative offices of education, medical treatment, research, or indoor areas of catering trade and business) and in the stationary mode and the talking mode, the control module 21 controls the working of the audio signal volume adjustment module 22, the active noise cancellation module 23, and the ambient sound adjustment module 24 according to the usage scenario, the sound pressure level of the ambient sound signal, and the energy distribution and the spectral distribution of the ambient sound signal, including:

The voice enhancement submodule 242 is controlled to perform the enhancement processing on the voice signal in the ambient sound signal.

The EQ processing submodule 244 is controlled to perform the EQ compensation processing on the voice signal band in ambient sound signal, and output the ambient sound signal to the speaker 30 for playback.

The wind noise suppression submodule 241 and the dynamic range control submodule 243 are controlled to be disabled.

The active noise cancellation module 23 is controlled to be disabled or perform the active noise cancellation processing on the ambient sound signal.

The audio signal volume adjustment module 22 is controlled to turn down the volume or stop playing the audio signal.

The adaptive audio control device in the embodiments of the disclosure may have a plurality of ambient sound acquisition microphones 13, including the microphone which is set on the headphone shell and configured to acquire the sound of surrounding environment of the user, and the microphone which is set in the headphone and configured to acquire the ambient sound heard at an ear of the user. The manner of setting a plurality of microphones may acquire the ambient sound more accurately, and may reflect the situation of the ambient sound heard at an ear of the user. The manner may be applied to the active noise cancellation function, is beneficial for locating an ambient sound source and regulating the proportion of the voice to the ambient sound. The manner may also optimize noise cancellation quantity better, which is beneficial for more intelligent adaptive audio control.

In other embodiments, the control module 21 may also analyze the ambient sound signal acquired by the ambient sound acquisition microphone 13 to obtain the sound pressure level and the energy distribution and the spectral distribution of the ambient sound signal, and realize a more abundant scenario analysis with reference to the data acquired by the acceleration sensor, the location module, and other sensors, so as to control the audio signal volume adjustment module 22, the active noise cancellation module 23 and the ambient sound adjustment module 24 more delicately, and provide a better experience effect to the user.

Figure 4:
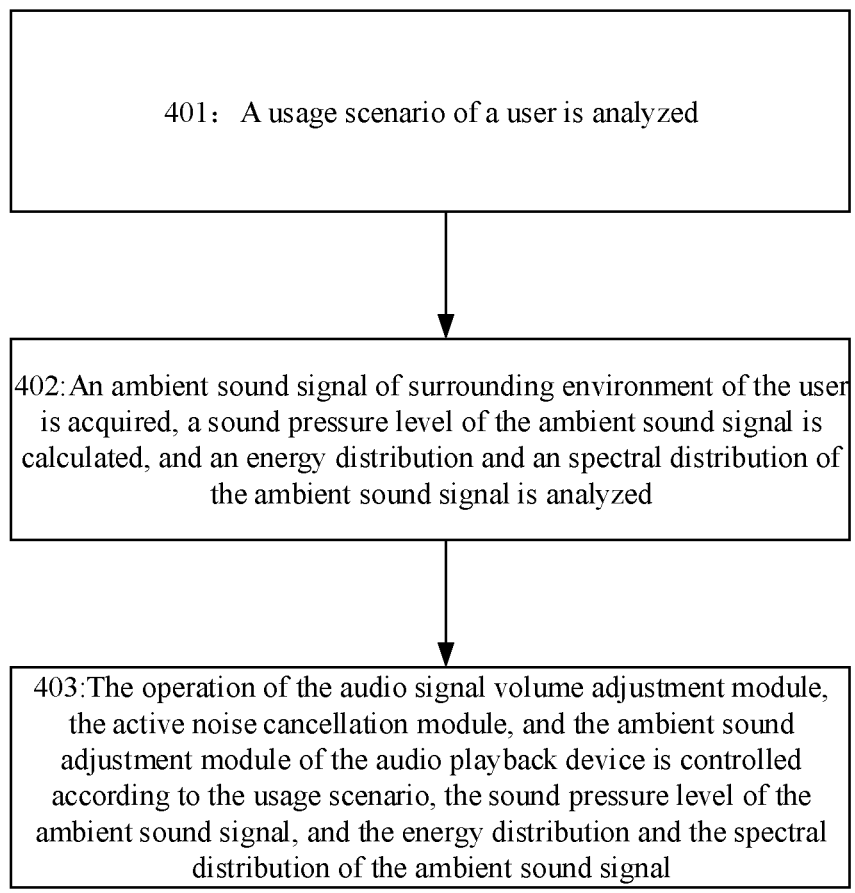
FIG. 4 illustrates a flowchart of an adaptive audio control method based on scenario identification provided by an embodiment of the disclosure.

For those skilled in the art, the adaptive audio control device based on scenario identification may be realized by hardware, software or a combination of hardware and software. Based on the same inventive concept, referring to FIG. 4, the adaptive audio control method based on scenario identification provided by the embodiments of the disclosure includes the following steps.

At S401, the usage scenario of the user is analyzed.

Specifically, in S401, the acceleration data of the user may be acquired, and the usage scenario of the user is analyzed according to the acceleration data. It is easy to be understood that the geographic location data of the user may also be acquired, and the usage scenario of the user is analyzed according to the acceleration data and the geographic location data.

At S402, the ambient sound signal of surrounding environment of the user is acquired, the sound pressure level of the ambient sound signal is calculated, and the energy distribution and the spectral distribution of the ambient sound signal is analyzed.

At S403, the working of the audio signal volume adjustment module, the active noise cancellation module, and the ambient sound adjustment module of the audio playback device is controlled according to the usage scenario, the sound pressure level of the ambient sound signal, and the energy distribution and the spectral distribution of the ambient sound signal.

In an implementation mode, the audio playback device is a headphone.

In another implementation mode, the ambient sound adjustment module 24 includes any one of a combination of the following submodules: the wind noise suppression submodule 241, the voice enhancement submodule 242, the dynamic range control submodule 243, and the EQ processing submodule 244.

In another implementation mode, that the usage scenario of the user is analyzed at S401 includes that: the environment type of the user is determined according to the geographic location data; the movement speed of the user is calculated according to the geographic location data; the cadence value of the user is calculated according to the acceleration data; and the motion mode of the user is determined according to the movement speed and the cadence value of the user.

In another implementation mode, the environment types include the indoor environment and the road environment; the movement modes include any one of the followings: the stationary mode, the mode of waling on road, and the transportation mode.

In another implementation mode, if the movement speed is less than the first speed threshold and the cadence value is less than the first cadence value threshold, the user is in the stationary mode; if the movement speed is in the walking speed interval and the cadence value is in the walking cadence value interval, the user is in the walking mode; and if the movement speed is greater than the second speed threshold, the user is in the transportation mode.

In another implementation mode, the audio playback device further includes the bone conduction microphone or the infrared proximity sensor. The usage scenario of the user also includes the talking state of the user. The method further includes the following step of determining, according to the signal output by the bone conduction microphone or the infrared proximity sensor, whether the user is in the talking mode.

In another implementation mode, that the ambient sound signal of surrounding environment of the user is acquired includes that: the ambient sound signal of the real-time location of the user is acquired, and the ambient sound signal heard at an ear of the user is acquired.

<First Usage Scenario>

If the usage scenario is that the user is in the road environment and in the walking mode, the operation that the working of the audio signal volume adjustment module 22, the active noise cancellation module 23, and the ambient sound adjustment module 24 is controlled according to the usage scenario, the sound pressure level of the ambient sound signal, and the energy distribution and the spectral distribution of the ambient sound signal further includes that:

the wind noise suppression submodule 241 is controlled to perform suppressive filtering to a wind noise signal in the ambient sound signal;

it is monitored whether the ambient sound signal contains a voice signal; if the ambient sound signal contains a voice signal, the voice enhancement submodule 242 is triggered to perform enhancement processing on the voice signal in the ambient sound signal;

the dynamic range control submodule 243 is controlled to perform dynamic range adjustment on the ambient sound signal according to the sound pressure level of the ambient sound signal;

the EQ processing submodule 244 is controlled to perform the EQ compensation processing on the ambient sound signal;

the working parameters of the audio signal volume adjustment module 22 are controlled according to the sound pressure level of the ambient sound signal reaching the speaker of the audio playback device, so that the sound pressure level of the audio signal reaching the speaker and the sound pressure level of the ambient sound signal reaching the speaker keep the preset proportion.

In an implementation mode, that the dynamic range control submodule 243 performs the dynamic range adjustment on the ambient sound signal according to the sound pressure level of the ambient sound signal includes that: when the sound pressure level of the ambient sound signal is greater than 40 dBA and less than or equal to 50 dBA, the amplification processing is performed to the ambient sound signal; when the sound pressure level of the ambient sound signal is greater than 60 dBA, the attenuation processing is performed to the ambient sound signal.

In another implementation mode, performing the EQ compensation processing on the ambient sound signal includes performing the EQ compensation processing on the voice signal band and the honk signal band in the ambient sound signal.

In another implementation mode, it is determined, according to the sound pressure level of the ambient sound signal, whether to enable the active noise cancellation module 23, and if the active noise cancellation module 23 is enabled, the noise cancellation level of the active noise cancellation module 23 is adjusted according to the sound pressure level of the ambient sound signal.

<Second Usage Scenario>

If the usage scenario is that the user is in the road environment and in the transportation mode, the operation that the working of the audio signal volume adjustment module 22, the active noise cancellation module 23, and the ambient sound adjustment module 24 is controlled according to the usage scenario, the sound pressure level of the ambient sound signal, and the energy distribution and the spectral distribution of the ambient sound signal further includes that:

it is monitored whether the ambient sound signal contains the voice signal; if the ambient sound signal contains a voice signal, the voice enhancement submodule 242 is triggered to perform enhancement processing on the voice signal in the ambient sound signal, and the EQ processing submodule 244 is triggered to perform EQ compensation processing on the voice signal in the ambient sound signal.

the active noise cancellation module 23 is controlled to perform active noise cancellation processing according to the strongest noise cancellation level; or, it is determined, according to the sound pressure level of the ambient sound signal, whether to enable the active noise cancellation module 23, and if the active noise cancellation module 23 is enabled, the noise cancellation level of the active noise cancellation module 23 is adjusted according to the sound pressure level of the ambient sound signal;

the working parameters of the audio signal volume adjustment module 22 are controlled according to the sound pressure level of the ambient sound signal reaching the speaker of the audio playback device, so that the sound pressure level of the audio signal reaching the speaker and the sound pressure level of the ambient sound signal reaching the speaker keep the preset proportion.

In an implementation mode, when the user is in the road environment and in the transportation mode, the wind noise suppression submodule 241 is controlled to be disabled.

In another implementation, when the user is in the road environment and in the transportation mode, it is monitored whether the sound pressure level of the ambient sound signal is greater than the preset upper limit of the sound pressure level or less than the preset lower limit of the sound pressure level; if the sound pressure level of the ambient sound signal is greater than the preset upper limit of the sound pressure level, the dynamic range control submodule (243) is triggered to perform the attenuation processing on the ambient sound signal; and if the sound pressure level of the ambient sound signal is less than the preset lower limit of the sound pressure level, the dynamic range control submodule (243) is triggered to perform the amplification processing on the ambient sound signal.

<Third Usage Scenario>

If the usage scenario is that the user is in the indoor environment and in the stationary mode and the talking mode, the operation that the working of the audio signal volume adjustment module 22, the active noise cancellation module 23, and the ambient sound adjustment module 24 is controlled according to the usage scenario, the sound pressure level of the ambient sound signal, and the energy distribution and the spectral distribution of the ambient sound signal further includes that:

the voice enhancement submodule 242 is controlled to perform the enhancement processing on the voice signal in the ambient sound signal;

the EQ processing submodule 244 is controlled to perform the EQ compensation processing on the voice signal band in the ambient sound signal;

the active noise cancellation module 23 is controlled to be disabled or perform the active noise cancellation processing on the ambient sound signal;

the audio signal volume adjustment module 22 is controlled to turn down the volume or stop playing the audio signal.

In an implementation mode, the wind noise suppression submodule 241 and the dynamic range control submodule 243 are controlled to be disabled.

It should be noted that each embodiment in the description is described in a progressive manner. Each embodiment focuses on differences from other embodiments, and the same and similar parts between the embodiments may be referred to each other. However, those skilled in the art should understand that the above embodiments may be used alone or in combination with each other as needed. The device embodiments described above are merely illustrative, and the modules illustrated as separate components may or may not be physically separate.

In addition, the flowcharts and block diagrams in the drawings illustrate the architecture, functionality, and operation of possible implementations of apparatus, methods, and computer program products according to various embodiments of the disclosure. In this regard, each block of the flowcharts or block diagrams may represent a module, a program segment, or a portion of code, the module, the program segment or portion of the code includes one or more executable instructions for implementing the specified logical functions. It should also be noted that in some alternative implementations, the functions noted in the blocks may also occur in a different order than that illustrated in the drawings. For example, two consecutive blocks may be executed substantially in parallel, and may sometimes be executed in a reverse order, depending upon the functionality involved. It is also to be noted that each block of the block diagrams and/or flowcharts, and combinations of the blocks in the block diagrams and/or flowcharts, may be implemented with a dedicated hardware-based device that performs the specified function or action, or it may be implemented by a combination of the dedicated hardware and a computer instruction.

The computer program product provided by the embodiment of the disclosure includes a computer readable storage medium storing the program code, and the program code includes instructions for executing the method described in the above method embodiment. Specific implementation may be referred to the method embodiment, and will not be repeated herein.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the disclosure, it should be understood that the disclosed system, apparatus, and method may be implemented in other manners. The described apparatus embodiment is merely exemplary. For example, the unit division is merely logical function division and may be other division in actual implementation. For another example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the disclosure essentially, or the part contributing to the prior art, or some of the technical solutions may be implemented in a form of a software product. The software product is stored in a storage medium and includes several instructions for instructing a computer device (which may be a personal computer, a server, or a network device) to perform all or some of the steps of the methods described in the embodiments of the disclosure. The foregoing storage medium includes any medium that can store program code, such as a U disk, a removable hard disk, an ROM, an RAM, a magnetic disk, or an optical disc.

It should be noted that, in the description, relational terms such as first and second are used merely to distinguish one entity or operation from another entity or operation, and do not necessarily require or imply any such actual relationship or order between these entities or operations. Furthermore, the term "include" or "include" or any other variations thereof is intended to encompass a non-exclusive inclusion, such that a process, a method, an item, or a device that includes a plurality of elements includes not only those elements but also other elements that are not explicitly listed, or elements that are inherent to such process, method, item, or device. In the case of no more restrictions, an element that is defined by the phrase "including a . . . " does not exclude the presence of additional equivalent elements in the process, method, item, or device that includes the element.

The above descriptions are only preferred embodiments of the disclosure, and are not intended to limit the application, for those skilled in the art, various changes and modifications may be made to the application. Any modifications, equivalent replacements, improvements and the like within the spirit and principle of the application should fall within the protection scope of the claims of the application. It should be noted that similar reference numerals and letters indicate similar items in the following figures.

Therefore, once an item is defined in one figure, it is not necessary to be further defined and explained in the subsequent figures.

Although some of the specific embodiments of the application have been described in detail by way of example, those skilled in the art should understand that the above examples are only for the purpose of illustration and not intended to limit the scope of the application. Those skilled in the art will appreciate that the above embodiments may be modified without departing from the scope of the application. The scope of the application is defined by the appended claims.

The invention claimed is:

1. A method for controlling an audio playback device, comprising:
acquiring acceleration data of a user, and analyzing a usage scenario of the user according to the acceleration data;
acquiring an ambient sound signal of surrounding environment of the user, calculating a sound pressure level (SPL) of the ambient sound signal, and analyzing an energy distribution and a spectral distribution of the ambient sound signal; and
controlling an audio signal volume of the audio playback device, an active noise cancellation level of the audio playback device, and adjustment of the ambient sound signal according to the usage scenario, the sound pressure level of the ambient sound signal, and the energy distribution and the spectral distribution of the ambient sound signal.

2. The method of claim 1, further comprising:
acquiring geographic location data of the user; wherein analyzing the usage scenario of the user according to the acceleration data and the geographic location data.

3. The method of claim 2, wherein the adjustment of the ambient sound signal comprises any one of wind noise suppression, voice enhancement, dynamic range adjustment or equalization (EQ) compensation, or any combination thereof.

4. The method of claim 3, wherein analyzing the usage scenario of the user according to the acceleration data and the geographic location data comprises:
determining an environment type of the user according to the geographic location data;
calculating a movement speed of the user according to the geographic location data;
calculating a cadence value of the user according to the acceleration data; and
determining a motion mode of the user according to the movement speed and the cadence value.

5. The method of claim 4, wherein the environment type comprise an indoor environment and a road environment; the motion mode comprise any one of: a stationary mode, a walking mode, or a transportation mode.

6. The method of claim 5, further comprising: determining whether the user is in a talking mode.

7. The method of claim 5, wherein if the usage scenario is that the user is in the road environment and in the walking mode, the controlling step comprises one or more of:
performing suppressive filtering to a wind noise signal in the ambient sound signal;
monitoring whether the ambient sound signal contains a voice signal; if the ambient sound signal contains a voice signal, performing enhancement processing on the voice signal in the ambient sound signal;
performing dynamic range adjustment on the ambient sound signal according to the sound pressure level of the ambient sound signal;
performing EQ compensation processing on the ambient sound signal;
controlling the audio signal volume of the audio playback device according to the sound pressure level of the ambient sound signal reaching a speaker of the audio playback device, so that the sound pressure level of the audio signal reaching the speaker and the sound pressure level of the ambient sound signal reaching the speaker keep a preset proportion; and
determining, according to the sound pressure level of the ambient sound signal, whether to perform active noise cancellation, and if the active noise cancellation is to be performed, adjusting a noise cancellation level of the active noise cancellation according to the sound pressure level of the ambient sound signal.

8. The method of claim 5, wherein if the usage scenario is that the user is in the road environment and in the transportation mode, the controlling step comprises one or more of:
monitoring whether the ambient sound signal contains a voice signal; if the ambient sound signal contains a voice signal, performing an enhancement processing on the voice signal in the ambient sound signal, and performing an EQ compensation processing on the voice signal in the ambient sound signal;
setting the active noise cancellation level to a highest noise cancellation level, or determining, according to the sound pressure level of the ambient sound signal, whether to perform the active noise cancellation, and if the active noise cancellation is to be performed, adjusting the noise cancellation level of the active noise cancellation according to the sound pressure level of the ambient sound signal;
controlling the audio signal volume of the audio playback device according to the sound pressure level of the ambient sound signal reaching the speaker of the audio playback device, so that the sound pressure level of the audio signal reaching the speaker and the sound pressure level of the ambient sound signal reaching the speaker keep a preset proportion;
not performing wind noise suppression; and
monitoring whether the sound pressure level of the ambient sound signal is greater than a preset upper limit of the sound pressure level or less than a preset lower limit of the sound pressure level; if the sound pressure level of the ambient sound signal is greater than the preset upper limit of the sound pressure level, performing attenuation processing on the ambient sound signal; and if the sound pressure level of the ambient sound signal is less than the preset lower limit of the sound pressure level, performing amplification processing on the ambient sound signal.

9. The method of claim 5, wherein if the usage scenario is that the user is in the indoor environment, in the stationary mode and the talking mode, the controlling step comprises one or more of:
performing an enhancement processing on the voice signal in the ambient sound signal;
performing an EQ compensation processing on a voice signal band in the ambient sound signal;
not performing the active noise cancellation;
turning down the audio signal volume or stopping playing the audio signal; and not performing wind noise suppression or dynamic range adjustment.

10. The method of claim 1, wherein acquiring the ambient sound signal of surrounding environment of the user comprises: acquiring the ambient sound signal of a real-time location of the user, and acquiring the ambient sound signal heard at an ear of the user.

11. A system for controlling an audio playback device, comprising:
one or more processors;
a memory which is coupled to at least one of the one or more processors;
wherein the memory is configured to store computer program instructions; when the computer program instructions are executed by the at least one processor, the system performs a method for controlling an audio playback device; the method comprises:
acquiring acceleration data of a user, and analyzing a usage scenario of the user according to the acceleration data;
acquiring an ambient sound signal of surrounding environment of the user, calculating a sound pressure level of the ambient sound signal, and analyzing an energy distribution and a spectral distribution of the ambient sound signal; and
controlling an audio signal volume of the audio playback device, an active noise cancellation level of the audio playback device, and adjustment of the ambient sound signal according to the usage scenario, the sound pressure level of the ambient sound signal, and the energy distribution and the spectral distribution of the ambient sound signal.

12. The system of claim 11, wherein when the computer program instructions are executed by the at least one processor, the system performs the method for controlling an audio playback device; the method further comprises:
acquiring geographic location data of the user; wherein analyzing the usage scenario of the user according to the acceleration data and the geographic location data.

13. The system of claim 12, wherein the adjustment of the ambient sound signal comprises any one of wind noise suppression, voice enhancement, dynamic range adjustment or equalization (EQ) compensation, or any combination thereof.

14. The system of claim 13, wherein when executing the instruction of analyzing the usage scenario of the user according to the acceleration data and the geographic location data, the at least one processor performs operations of:
determining an environment type of the user according to the geographic location data;
calculating a movement speed of the user according to the geographic location data;
calculating a cadence value of the user according to the acceleration data; and
determining the motion mode of the user according to the movement speed and the cadence value.

15. The system of claim 14, wherein the environment types comprise an indoor environment and a road environment; the motion modes comprise any one of: a stationary mode, a walking mode, or a transportation mode.

16. The system of claim 15, wherein when the computer program instructions are executed by the at least one processor, the system performs the method for controlling an audio playback device; the method further comprises: determining whether the user is in a talking mode.

17. The system of claim 15, wherein if the usage scenario is that the user is in the road environment and in the walking mode, when executing the instruction of controlling the audio signal volume, the active noise cancellation level, and the adjustment of the ambient sound signal of the audio playback device according to the usage scenario, the sound pressure level of the ambient sound signal, and the energy distribution and the spectral distribution of the ambient sound signal, the at least one processor performs one or more of:
performing suppressive filtering to a wind noise signal in the ambient sound signal;
monitoring whether the ambient sound signal contains a voice signal; if the ambient sound signal contains a voice signal, performing enhancement processing on the voice signal in the ambient sound signal;
performing dynamic range adjustment on the ambient sound signal according to the sound pressure level of the ambient sound signal;
performing EQ compensation processing on the ambient sound signal;
controlling the audio signal volume of the audio playback device according to the sound pressure level of the ambient sound signal reaching a speaker of the audio playback device, so that the sound pressure level of the audio signal reaching the speaker and the sound pressure level of the ambient sound signal reaching the speaker keep a preset proportion; and
determining, according to the sound pressure level of the ambient sound signal, whether to perform active noise cancellation, and if the active noise cancellation is to be performed, adjusting a noise cancellation level of the active noise cancellation according to the sound pressure level of the ambient sound signal.

18. The system of claim 15, wherein if the usage scenario is that the user is in the road environment and in the transportation mode, when executing the instruction of controlling the audio signal volume, the active noise cancellation level, and the adjustment of the ambient sound signal of the audio playback device according to the usage scenario, the sound pressure level of the ambient sound signal, and the energy distribution and the spectral distribution of the ambient sound signal, the at least one processor performs one or more of:
monitoring whether the ambient sound signal contains the voice signal; if the ambient sound signal contains a voice signal, performing the enhancement processing on the voice signal in the ambient sound signal, and performing the EQ compensation processing on the voice signal in the ambient sound signal;
setting the active noise cancellation level to a highest noise cancellation level, or determining, according to the sound pressure level of the ambient sound signal, whether to perform the active noise cancellation, and if the active noise cancellation is to be performed, adjusting the noise cancellation level of the active noise cancellation according to the sound pressure level of the ambient sound signal;
controlling the audio signal volume of the audio playback device according to the sound pressure level of the ambient sound signal reaching the speaker of the audio playback device, so that the sound pressure level of the audio signal reaching the speaker and the sound pressure level of the ambient sound signal reaching the speaker keep the preset proportion;
not performing the wind noise suppression; and
monitoring whether the sound pressure level of the ambient sound signal is greater than a preset upper limit of the sound pressure level or less than a preset lower limit of the sound pressure level; if the sound pressure level of the ambient sound signal is greater than the preset upper limit of the sound pressure level, performing attenuation processing on the ambient sound signal; and if the sound pressure level of the ambient sound signal is less than the preset lower limit of the sound pressure level, performing amplification processing on the ambient sound signal.

19. The system of claim 15, wherein if the usage scenario is that the user is in the indoor environment and in the stationary mode and the talking mode, when executing the instruction of controlling the audio signal volume, the active noise cancellation level, and the adjustment of the ambient sound signal of the audio playback device according to the usage scenario, the sound pressure level of the ambient sound signal, and the energy distribution and the spectral distribution of the ambient sound signal, the at least one processor performs one or more of:

performing the enhancement processing on the voice signal in the ambient sound signal;

performing the EQ compensation processing on a voice signal band in the ambient sound signal;

not performing the active noise cancellation;

turning down the audio signal volume or stopping playing the audio signal; and not performing the wind noise suppression or the dynamic range adjustment.

20. A computer program product stored in a non-transitory computer readable storage medium, that when executed by the processor, implements a method for controlling an audio playback device, the method comprising:

acquiring acceleration data of a user, and analyzing a usage scenario of the user according to the acceleration data, acquiring an ambient sound signal of surrounding environment of the user, calculating a sound pressure level (SPL) of the ambient sound signal, and analyzing an energy distribution and a spectral distribution of the ambient sound signal; and controlling an audio signal volume of the audio playback device, an active noise cancellation level of the audio playback device, and adjustment of the ambient sound signal according to the usage scenario, the sound pressure level of the ambient sound signal, and the energy distribution and the spectral distribution of the ambient sound signal.

\* \* \* \* \*

UNITED STATES PATENT AND TRADEMARK OFFICE
CERTIFICATE OF CORRECTION

Page 1 of 1

PATENT NO.        : 10,979,814 B2
APPLICATION NO.   : 16/647768
DATED             : April 13, 2021
INVENTOR(S)       : Jian Zhao et al.

It is certified that error appears in the above-identified patent and that said Letters Patent is hereby corrected as shown below:

On the Title Page

Item (73), please list "Assignee" as:
Beijing Xiaoniao Tingting Technology Co., LTD, Beijing (CN)

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*